(12) United States Patent
Nakagawa

(10) Patent No.: US 8,351,859 B2
(45) Date of Patent: Jan. 8, 2013

(54) COMMUNICATION APPARATUS AND COMMUNICATION CONTROL METHOD

(75) Inventor: Hideyuki Nakagawa, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/338,652

(22) Filed: Dec. 28, 2011

(65) Prior Publication Data

US 2012/0100807 A1  Apr. 26, 2012

Related U.S. Application Data

(63) Continuation of application No. 12/499,715, filed on Jul. 8, 2009, now abandoned.

(30) Foreign Application Priority Data

Jul. 24, 2008 (JP) ................................ 2008-191024

(51) Int. Cl.
*H04B 7/00* (2006.01)
(52) U.S. Cl. ...................................... 455/41.2; 455/574
(58) Field of Classification Search ................ 455/418, 455/419, 566, 557, 574, 41.2, 41.1; 713/320, 713/324
See application file for complete search history.

(56) References Cited

U.S. PATENT DOCUMENTS

| | | | |
|---|---|---|---|
| 7,535,881 B2 | 5/2009 | Maekawa et al. | |
| 7,567,815 B2 | 7/2009 | Nishikawa et al. | |
| 7,577,402 B2 | 8/2009 | Fukuoka | |
| 7,603,145 B2 * | 10/2009 | Zinn et al. | 455/574 |
| 7,778,675 B1 | 8/2010 | Righi | |
| 7,821,397 B2 | 10/2010 | Itasaki et al. | |
| 2004/0203365 A1 * | 10/2004 | Yamamoto et al. | 455/41.2 |
| 2005/0195772 A1 | 9/2005 | Nishikawa et al. | |
| 2006/0034315 A1 | 2/2006 | Maekawa et al. | |
| 2007/0216530 A1 | 9/2007 | Fukuoka | |
| 2008/0122584 A1 | 5/2008 | Itasaki et al. | |

FOREIGN PATENT DOCUMENTS

| | | |
|---|---|---|
| JP | H08-191853 | 7/1996 |
| JP | 2000-071987 | 3/2000 |
| JP | 2001-032584 | 2/2001 |
| JP | 2001-243431 | 9/2001 |
| JP | 2002-009660 | 1/2002 |
| JP | 2002-135194 | 5/2002 |
| JP | 2002-271252 | 9/2002 |
| JP | 2005-286998 | 10/2005 |

(Continued)

OTHER PUBLICATIONS

Explanation of Non-English Language References.
Notice of Reasons for Rejection mailed by Japan Patent Office on Oct. 20, 2009 in the corresponding Japanese patent application No. 2008-191024.

(Continued)

*Primary Examiner* — Ping Hsieh
(74) *Attorney, Agent, or Firm* — Knobbe, Martens, Olson and Bear, LLP

(57) ABSTRACT

According to one embodiment, a communication apparatus comprises a close proximity wireless transfer device, a closeness detection module and a device control module. The close proximity wireless transfer device executes a close proximity wireless transfer. The closeness detection module detects that the close proximity wireless transfer device and an external device are in a close proximity state. Power which the closeness detection module consumes is lower than power which the close proximity wireless transfer device consumes in an idle state. The device control module is configured to activate the close proximity wireless transfer device when the closeness detection module detects the close proximity state.

5 Claims, 3 Drawing Sheets

FOREIGN PATENT DOCUMENTS

| | | |
|---|---|---|
| JP | 2005-311918 | 11/2005 |
| JP | 2006-050020 | 2/2006 |
| JP | 2006-163819 | 6/2006 |
| JP | 2006-186894 | 7/2006 |
| JP | 2007-500461 | 1/2007 |
| JP | 2008-129988 | 6/2008 |
| WO | WO 2005-094046 | 10/2005 |

OTHER PUBLICATIONS

Decision of Rejection mailed by Japan Patent Office on Mar. 30, 2010 in the corresponding Japanese patent application No. 2008-191024.

Notice of Reasons for Rejection mailed Jan. 10, 2012 in corresponding Japanese Application No. JP 2010-148070.

* cited by examiner

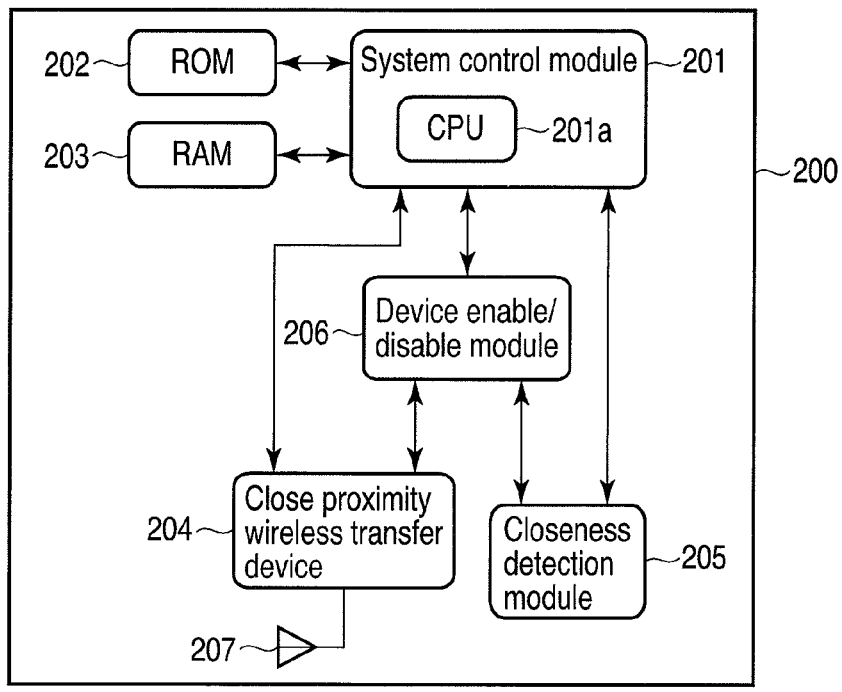
F I G. 1
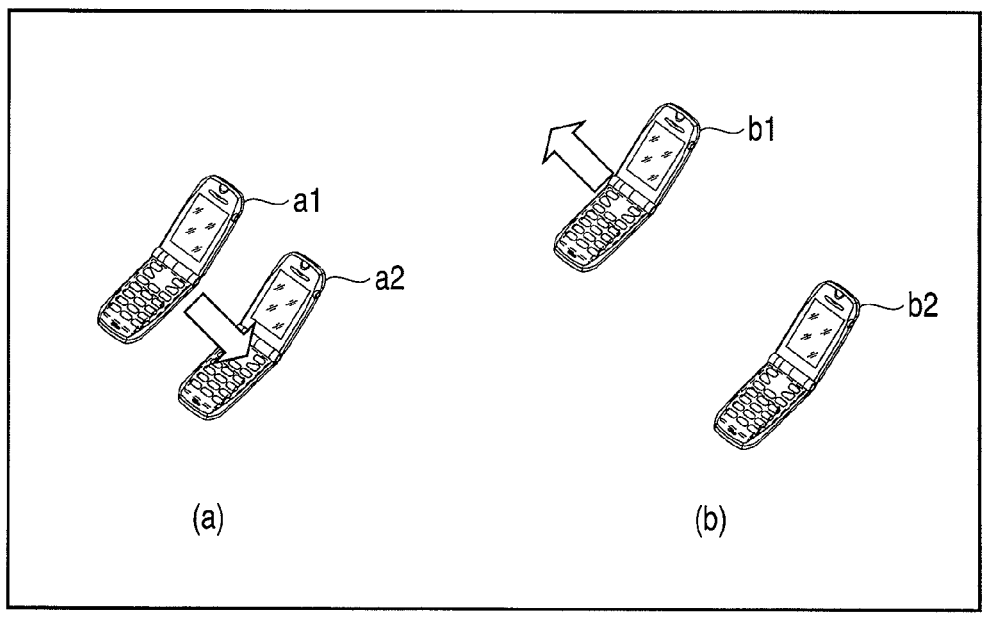
F I G. 2

COMMUNICATION APPARATUS AND COMMUNICATION CONTROL METHOD

CROSS-REFERENCE TO RELATED APPLICATIONS

This application a continuation of U.S. patent application Ser. No. 12/499,715, filed Jul. 8, 2009, which is based upon and claims the benefit of priority from Japanese Patent Application No. 2008-191024, filed Jul. 24, 2008, the entire contents of which are incorporated herein by reference.

BACKGROUND

1. Field

One embodiment of the invention relates to a communication apparatus and communication control method which communicates by means of a close proximity wireless transfer method.

2. Description of the Related Art

In a close proximity wireless transfer method, when the user brings devices close to each other, the devices can communicate with each other. Since this operation is intuitive and simple for the user, the close proximity wireless transfer is promised to be widespread in portable terminal devices and the like in the future.

A device of the close proximity wireless transfer method needs to execute standby processing for receiving a signal sent from another device. Consequently, the device consumes power even in a standby state in which communication such as data transfer is not actually made. Since the device using the close proximity wireless transfer method is used in a portable terminal device or the like, and long-term, continuous use is assumed, it is desirable to reduce the power consumption as much as possible.

Jpn. Pat. Appln. KOKAI Publication No. 2005-311918 discloses a potable terminal device including a magnetic sensor and infrared communication module. The infrared ray has strong directivity. To successfully make infrared communication, therefore, precise alignment is necessary. In the portable terminal device of Jpn. Pat. Appln. KOKAI Publication No. 2005-311918, the magnetic sensor is used to align the infrared communication module of the device with that of another device. If the magnetic sensor detects that the portable terminal devices are aligned with each other, the devices can execute infrared communication.

The portable terminal device of Jpn. Pat. Appln. KOKAI Publication No. 2005-311918 does not consider the distance to another device. If the devices are in a close proximity state, i.e., if the distance between them falls within a predetermined range of communication, it is possible to execute close proximity wireless transfer. To efficiently reduce the power consumption of the close proximity wireless transfer, therefore, it is necessary to implement a new power saving technique which considers the distance between the devices.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary block diagram showing the arrangement of a communication apparatus according to an embodiment of the present invention;

FIG. 2 is an exemplary view for explaining an example of use of two communication apparatuses according to the embodiment;

DETAILED DESCRIPTION

Figure 3:
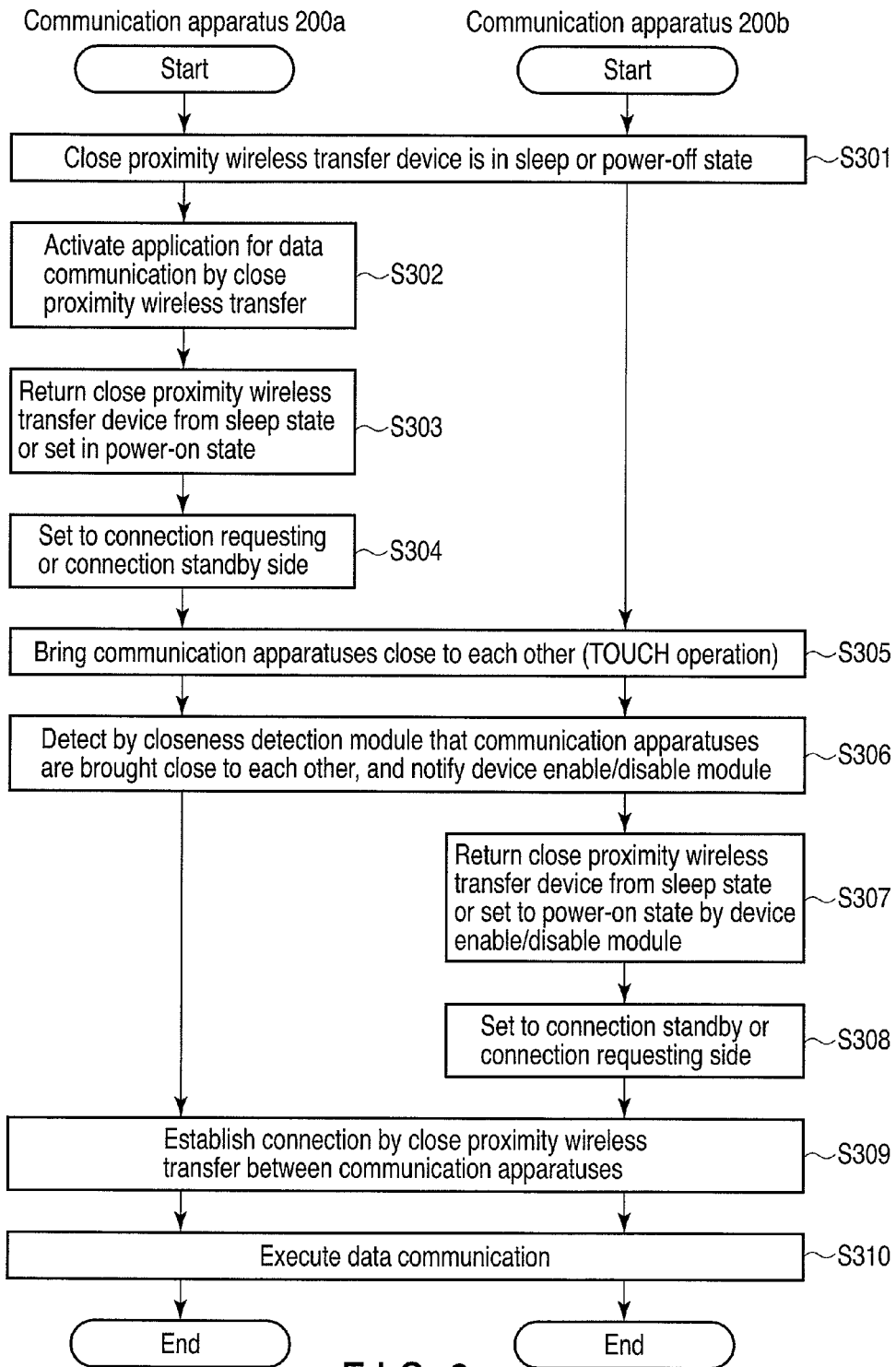
FIG. 3 is an exemplary flowchart showing the procedure of processing when two communication apparatuses according to the embodiment enter a close proximity state.

Various embodiments according to the invention will be described hereinafter with reference to the accompanying drawings. In general, according to one embodiment of the invention, there is provided a communication apparatus comprising: a close proximity wireless transfer device configured to execute a close proximity wireless transfer; a closeness detection module configured to detect that the close proximity wireless transfer device and an external device are in a close proximity state, wherein power which the closeness detection module consumes is lower than power which the close proximity wireless transfer device consumes in an idle state; and a device control module configured to activate the close proximity wireless transfer device when the closeness detection module detects the close proximity state.

First, the arrangement of a communication apparatus 200 according to one embodiment of the present invention will be described with reference to FIG. 1. This communication apparatus 200 is implemented as, e.g., a portable terminal device such as a cellular phone or PDA, a personal computer, or a consumer device such as a TV or audio player. The communication apparatus 200 includes a system control module 201, ROM 202, RAM 203, close proximity wireless transfer device 204, closeness detection module 205, and device enable/disable module 206.

The system control module 201 controls the operations of respective modules of the communication apparatus 200. The system control module 201 includes a CPU 201a, and is connected to the ROM 202, RAM 203, close proximity wireless transfer device 204, closeness detection module 205, and device enable/disable module 206.

The RAM 203 stores instructions, data and stacks in process. The ROM 202 stores application programs, drivers, and the like. The CPU 201a loads instructions and data stored in the ROM 202 onto the RAM 203, and executes required processes. The CPU 201a executes, for example, an application program for transferring data such as a data file using the close proximity wireless transfer.

The CPU 201a executes a process on the basis of information which pertains to a close proximity state with another communication apparatus which is sent from the closeness detection module 205, and the operation state of the close proximity wireless transfer device 204 which is sent from the device enable/disable module 206.

The close proximity wireless transfer device 204 executes the close proximity wireless transfer. The close proximity wireless transfer is a wireless communication technique capable of data communication only within a relatively short range such as several centimeters like Near Field Communication (NFC). The close proximity wireless transfer between the close proximity wireless transfer device 204 and another close proximity wireless transfer device is executed as a peer-to-peer communication. The range of communication is, for example, 3 cm. Wireless connection between the close proximity wireless transfer device 204 and another close proximity wireless transfer device can be established only when they are brought close to each other so that their distance falls within a predetermined distance (e.g., 3 cm). The close proximity wireless transfer uses an induced electric field. As the close proximity wireless transfer method, for example, TransferJET can be used. The TransferJET is the close proximity wireless transfer method using UWB, and can realize high-speed data transfer.

The close proximity wireless transfer device 204 includes an antenna module 207. The antenna module 207 sends/receives data to/from another communication apparatus by means of signals using an induced electric field.

The closeness detection module 205 detects the close proximity state between the close proximity wireless transfer device 204 and another close proximity wireless transfer device. That is, the closeness detection module 205 detects, as the close proximity state, that another close proximity wireless transfer device is brought within the predetermined distance from the close proximity wireless transfer device 204. The closeness detection module 205 notifies the system control module 201 and device enable/disable module 206 of the detection of another close proximity wireless transfer device.

The power consumption of the closeness detection module 205 in a standby or operation state is smaller than that of the close proximity wireless transfer device 204 in an idle state. A detectable distance within which the closeness detection module 205 can detect the close proximity state with another close proximity wireless transfer device does not limit a range of communication within which the close proximity wireless transfer device 204 can communicate with another close proximity wireless transfer device. That is, the detectable distance is greater than or equal to the range of communication and the difference between the distances is less than or equal to a predetermined value. If, for example, the range of communication is 3 cm, assume that the detectable distance is 5 cm. By setting the range of communication and the detectable distance to have such relationship, the detectable distance of the closeness detection module 205 does not limit the range of communication of the close proximity wireless transfer device 204. As the closeness detection module 205, for example, a device which uses an induced magnetic field is available. The device which uses an induced magnetic field includes FeliCa®, an IC chip, and a non-contact charging device.

The device enable/disable module 206 controls the close proximity wireless transfer device 204 on the basis of the notification from the closeness detection module 205. Upon reception of a notification representing the close proximity state from the closeness detection module 205, the device enable/disable module 206 returns the close proximity wireless transfer device 204 from a sleep state, or sets it in a circuit-power-on state. On the other hand, upon reception of a notification representing close proximity state cancellation, the device enable/disable module 206 sets the close proximity wireless transfer device 204 in the sleep state or a circuit-power-off state. Note that the sleep state is an operation in a so-called power saving mode in which the close proximity wireless transfer device 204 stands by with a power consumption lower than in a normal operation state. Return from the sleep state indicates that the close proximity wireless transfer device 204 which has operated in the power saving mode resumes the normal operation state.

It is desirable to perform the operation of setting the close proximity wireless transfer device 204 in the sleep or circuit-power-off state a predetermined time after the closeness detection module 205 detects the close proximity state cancellation. This makes it possible to avoid a case in which if the user temporarily moves the communication apparatus 200 away from another communication apparatus accidentally during data transfer, the close proximity wireless transfer device 204 is set in the sleep or circuit-power-off state, and therefore the transfer fails.

FIGS. 2A and 2B show a use example when there exist two communication apparatuses 200 according to the embodiment. Referring to FIGS. 2A and 2B, the communication apparatuses 200 are shown as cellular phones. However, this embodiment is available in not only a cellular phone but also a personal computer or a consumer device such as a TV or audio player.

Cellular phones a1 and b1 respectively perform active operations on cellular phones a2 and b2 which are in the standby state. The operations include transfer of image or music data. Referring to FIG. 2A, connection by the close proximity wireless transfer is established by bringing cellular phone a1 close to cellular phone a2, and data transfer is executed between cellular phones a1 and a2. Referring to FIG. 2B, connection by the close proximity wireless transfer is disconnected by moving cellular phone b1 away from cellular phone b2 after the data transfer ends. Assume that in the following explanation, expressions "connection (communication) between the cellular phones (communication apparatuses)" and "connection (communication) between the close proximity wireless transfer devices 204" are synonymous, and both mean connection (communication) between the close proximity wireless transfer devices 204 provided for the cellular phones.

Referring to FIGS. 2A and 2B, close proximity wireless transfer devices 204 provided for cellular phones a2 and b2 on a standby side need to be always in the standby state for receiving signals sent from cellular phones a1 and b1, respectively. Consequently, the close proximity wireless transfer devices 204 consume power even in the standby state in which communication such as data transfer is not actually made. This is a problem for a communication apparatus including a cellular phone which is assumed to be continuously used for a long time.

The communication apparatus 200 of the embodiment includes, therefore, the closeness detection module 205 which consumes lower power than the close proximity wireless transfer device 204, as described above. The close proximity wireless transfer device 204 is usually in the sleep (power saving) or circuit-power-off state. When the closeness detection module 205 detects another close proximity wireless transfer device, the close proximity wireless transfer device 204 returns from the sleep state, or is set in the circuit-power-on state. That is, the close proximity wireless transfer device 204 starts operation by using, as a trigger, the detection of another close proximity wireless transfer device by the closeness detection module 205 which is always in the operation state.

Referring to FIG. 2A, the close proximity wireless transfer device 204 of cellular phone a1 returns from the sleep state, or enters the circuit-power-on state by using, as a trigger, the execution of an application program for executing the close proximity wireless transfer between the close proximity wireless transfer devices. When the user brings cellular phone a1 close to cellular phone a2, the closeness detection module 205 of cellular phone a2 detects that cellular phone a1 is in the close proximity state. The closeness detection module 205 of cellular phone a2 notifies the device enable/disable module 206 of the close proximity state of cellular phone a1. On the basis of the notification, the device enable/disable module 206 of cellular phone a2 returns the close proximity wireless transfer device 204 from the sleep state, or sets it in the circuit-power-on state. With this operation, it is possible to establish connection between the close proximity wireless transfer devices 204 provided for cellular phones a1 and a2, and execute communication such as data transfer.

On the other hand, as shown in FIG. 2B, when the user moves cellular phone b1 away from cellular phone b2 after data transfer is completed, the closeness detection module 205 of cellular phone b1 detects the cancellation of the close proximity state of cellular phone b2. The closeness detection module 205 of cellular phone b2 also detects the cancellation of the close proximity state of cellular phone b1. Device enable/disable modules 206 provided for cellular phones b1 and b2 set the close proximity wireless transfer devices 204 in the sleep or circuit-power-off state, respectively. With this operation, each of the close proximity wireless transfer devices 204 is in the sleep or circuit-power-off state until another close proximity wireless transfer device enters the close proximity state next, thereby reducing the power consumption.

Operations when communication is made between the two communication apparatuses 200 according to this embodiment will now be explained with reference to flowcharts shown in FIGS. 3 and 4. FIG. 3 shows an operation when the two communication apparatuses 200 are brought close to each other, and enters the close proximity state. In the following explanation, assume that the two communication apparatuses 200 are shown as a communication apparatus 200a and a communication apparatus 200b.

Communication apparatuses 200a and 200b are not in the close proximity state, and close proximity wireless transfer devices 204 provided for communication apparatuses 200a and 200b are in the sleep or circuit-power-off state (block S301). Next, in communication apparatus 200a, in response to the user operation of selecting a menu or file using a button or the like provided for communication apparatus 200a, a CPU 201a of communication apparatus 200a activates an application program for transferring the file or the like by the close proximity wireless transfer to communication apparatus 200b (block S302). The activated application program executes the close proximity wireless transfer through the close proximity wireless transfer device 204. The CPU 201a of communication apparatus 200a uses the activation of the application program as a trigger to return the close proximity wireless transfer device 204 from the sleep state or set the close proximity wireless transfer device 204 in the power-on state by using an application program or driver (block S303). Communication apparatus 200a is set to a connection requesting side (Initiator) which requests connection to communication apparatus 200b, or a connection standby side (Responder) which waits for a connection request from communication apparatus 200b (block S304). In accordance with the application program form and the like, it is possible to selectively set communication apparatus 200a in the connection requesting or connection standby side. The close proximity wireless transfer device 204 on the connection requesting side executes a process of sending a connection request signal to the close proximity wireless transfer device 204 on the connection standby side. The close proximity wireless transfer device 204 on the connection standby side performs a process of detecting the connection request signal at, e.g., regular intervals.

Communication apparatuses 200a and 200b are brought close to each other, and enter the close proximity state (block S305). A closeness detection module 205 of communication apparatus 200a detects the close proximity state with communication apparatus 200b, and notifies a device enable/disable module 206 of communication apparatus 200a of it. On the other hand, a closeness detection module 205 of communication apparatus 200b also detects the close proximity state with communication apparatus 200a, and notifies a device enable/disable module 206 of communication apparatus 200b of it (block S306).

The device enable/disable module 206 of communication apparatus 200b returns the close proximity wireless transfer device 204 from the sleep state, or sets the close proximity wireless transfer device 204 in the power-on state (block S307). The close proximity wireless transfer device 204 of communication apparatus 200b is set to the connection standby side when the close proximity wireless transfer device 204 of communication apparatus 200a is on the connection requesting side, and is set to the connection requesting side when the close proximity wireless transfer device 204 of communication apparatus 200a is on the connection standby side (block S308).

In this manner, connection between the close proximity wireless transfer device 204 of communication apparatus 200a and that of communication apparatus 200b is established (block S309). For example, the close proximity wireless transfer device 204 of communication apparatus 200a on the connection requesting side sends a connection request signal. The close proximity wireless transfer device 204 of communication apparatus 200b on the connection standby side detects the connection request signal and responds to it, thereby establishing the connection.

Communication apparatus 200a transfers data to communication apparatus 200b by the close proximity wireless transfer through the application program (block S310).

With the above processing, when communication apparatuses 200a and 200b are brought close to each other, the close proximity wireless transfer devices 204 operate by using as a trigger the detection of the close proximity state by the closeness detection modules 205 provided for the communication apparatuses 200, respectively. Since the close proximity wireless transfer devices 204 are in the sleep or power-off state until the closeness detection modules 205 detect the close proximity state, it is possible to save the power consumption of the close proximity wireless transfer devices 204.

Figure 4:
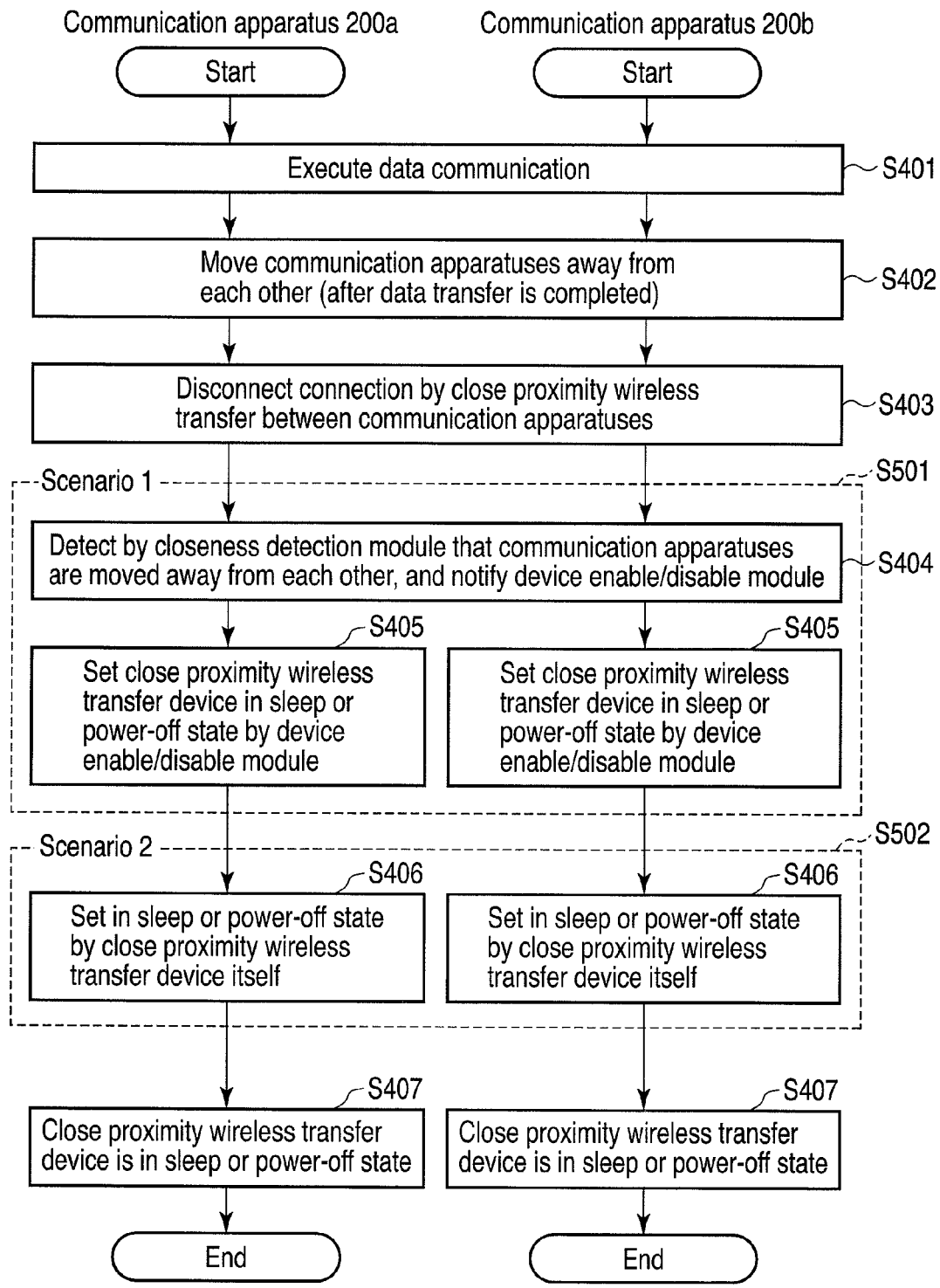
FIG. 4 is an exemplary flowchart showing the procedure of processing when the two communication apparatuses according to the embodiment cancel the close proximity state.

FIG. 4 shows an operation when the close proximity state is cancelled by moving the two communication apparatuses 200a and 200b which have been communicating away from each other.

Communication apparatuses 200a and 200b are connected with each other by the close proximity wireless transfer and data is transferred between them (block S401). After the data transfer is completed, communication apparatuses 200a and 200b are moved away from each other, and the close proximity state is cancelled (block S402). The connection between the close proximity wireless transfer device 204 of communication apparatus 200a and that of communication apparatus 200b is disconnected (block S403).

Two scenarios are considered for a method of setting the close proximity wireless transfer devices 204 of communication apparatuses 200a and 200b in the sleep or circuit-power-off state.

In the first scenario (block S501), the closeness detection module 205 of the communication apparatus 200 detects the cancellation of the close proximity state. The closeness detection module 205 of communication apparatus 200a detects the cancellation of the close proximity state with communication apparatus 200b, and notifies the device enable/disable module 206 of it. The closeness detection module 205 of communication apparatus 200b also detects the cancellation of the close proximity state with communication apparatus 200a, and notifies the device enable/disable module 206 of it (block S404). The device enable/disable module 206 of communication apparatus 200a sets the close proximity wireless transfer device 204 in the sleep or power-off state. The device enable/disable module 206 of communication apparatus 200b also sets the close proximity wireless transfer device 204 in the sleep or power-off state (block S405).

In the second scenario (block S502), the close proximity wireless transfer device 204 of the communication apparatus 200 detects the disconnection (connection disable). The close proximity wireless transfer device 204 of communication apparatus 200a sets itself in the sleep or power-off state. The close proximity wireless transfer device 204 of communication apparatus 200b also sets itself in the sleep or power-off state (block S406). Note that it is possible to determine to use the process in the first or second scenario in accordance with the form of use of the communication apparatus 200, an application program executed in the communication apparatus 200, or the like.

Either of the processes in the first and second scenarios sets the close proximity wireless transfer devices 204 of communication apparatuses 200a and 200b in the sleep or power-off state (block S407).

There is a case, however, in which communication apparatuses 200a and 200b are inadvertently moved away from each other. It is therefore desirable to set the close proximity wireless transfer devices 204 in the sleep or power-off state a predetermined time after the cancellation of the close proximity state or the disconnection of the communication is detected.

The above processing sets the close proximity wireless transfer devices 204 in the sleep or power-off state by using, as a trigger, the detection of the cancellation of the close proximity state by each of the closeness detection modules 205 of the communication apparatuses 200 or the disconnection of the connection established between the close proximity wireless transfer devices 204 when communication apparatuses 200a and 200b are moved away from each other. This makes it possible to save the power consumption of the close proximity wireless transfer devices 204.

As described above, in this embodiment, a closeness detection module of a communication apparatus can detect that a close proximity wireless transfer device and another close proximity wireless transfer device are in a close proximity state in which their distance falls within a range of communication, and that the close proximity state is cancelled. The power consumption of the operation of the closeness detection module is lower than that of the close proximity wireless transfer device in an idle state, thereby saving the power consumption of the close proximity wireless transfer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication apparatus comprising:
a close proximity wireless transfer device configured to consume a first power in a standby state;
a closeness detection module configured to detect whether an external device is within a first distance from the close proximity wireless transfer device,
wherein the first distance is greater than a communication range of the close proximity wireless transfer device,
wherein a difference between the first distance and the communication range is shorter than or equal to a first value and is greater than zero, and
wherein the closeness detection module is configured to consume a second power less than the first power; and
a device control module configured to set the close proximity wireless transfer device in the standby state from either a power saving state or a power-off state by activating the close proximity wireless transfer device if the closeness detection module detects that the external device is within the first distance from the close proximity wireless transfer device, and to set the close proximity wireless transfer device in either the power saving state or the power-off state when the closeness detection module detects that the external device is not within the first distance from the close proximity wireless transfer device.

2. The communication apparatus of claim 1, wherein the device control module is configured to activate the close proximity wireless transfer device by setting the close proximity wireless transfer device from the power saving state to an operation state or by turning on the close proximity wireless transfer device if the closeness detection module detects that the external device is within the first distance from the close proximity wireless transfer device.

3. The communication apparatus of claim 2, wherein the close proximity wireless transfer device is configured to change to either the power saving state or the power-off state if the closeness detection module detects the external device is disconnected.

4. The communication apparatus of claim 1, wherein the device control module is configured to set the close proximity wireless transfer device in either the power saving state or the power-off state, a predetermined time after the closeness detection module detects that the external device is not within the first distance from the close proximity wireless transfer device.

5. A communication control method of controlling a close proximity wireless transfer device configured to consume a first power in a standby state, the method comprising:
detecting whether an external device is within a predetermined distance from the close proximity wireless transfer device by a closeness detection module,
wherein the predetermined distance is greater than a communication range of the close proximity wireless transfer device,
wherein a difference between the predetermined distance and the communication range is shorter than or equal to a predetermined value and is greater than zero, and
wherein the closeness detection module is configured to consume a second power less than the first power; and setting the close proximity wireless transfer device from either a power saving state or a power-off state to the standby state by activating the close proximity wireless transfer device if the closeness detection module detects that the external device is within the predetermined distance from the close proximity wireless transfer device, and setting the close proximity wireless transfer device in either the power saving state or the power-off state when the closeness detection module detects that the external device is not within the predetermined distance from the close proximity wireless transfer device.

* * * * *